United States Patent [19]

Velke et al.

[11] Patent Number: 5,004,251

[45] Date of Patent: Apr. 2, 1991

[54] SULKY APPARATUS ATTACHABLE TO A SELF-PROPELLED POWER MOWER

[75] Inventors: James D. Velke; William R. Wright, both of Gaithersburg, Md.

[73] Assignee: Lawn-Wright, Inc., Gaithersburg, Md.

[21] Appl. No.: 487,156

[22] Filed: Mar. 1, 1990

[51] Int. Cl.⁵ ............................................. B62D 63/00
[52] U.S. Cl. .................... 280/32.7; 230/78; 230/645; 230/657; 56/DIG. 9
[58] Field of Search .............. 280/14.2, 402, 491.1, 280/491.3, 38, 657, 78, 84, 645, 63, 47.3, 47.32, 652, 32.7; 56/15.6, 16.7, DIG. 9, DIG. 14

[56] References Cited

U.S. PATENT DOCUMENTS

| | | | |
|---|---|---|---|
| 1,764,971 | 6/1930 | Nilson | 56/DIG. 14 X |
| 3,485,314 | 12/1969 | Herr | 280/32.7 X |
| 4,175,762 | 11/1979 | Vaughn et al. | 280/78 |

Primary Examiner—Charles A. Marmor
Assistant Examiner—Alan M. Kagen
Attorney, Agent, or Firm—Donald A. Kettlestrings

[57] ABSTRACT

A sulky apparatus attachable to a self-propelled power mower for transporting an operator in a standing position includes a rigid arm attached to the mower by a hinge which normally rotates about a horizontal axis. Operator foot-receiving platforms are supported by a wheel and are attached to the arm by means of a pivot for enabling the platforms to rotate about a normally vertical axis of the pivot. The horizontal distance between the hinge and the pivot is greater than the horizontal distance between the pivot and the rearwardmost portion of the apparatus to permit unlimited movement of the foot-receiving platforms and the wheel about the pivot axis. As a result, the mower and the apparatus can be moved in a reverse direction and the apparatus can be folded up under the handlebars of the mower.

18 Claims, 2 Drawing Sheets

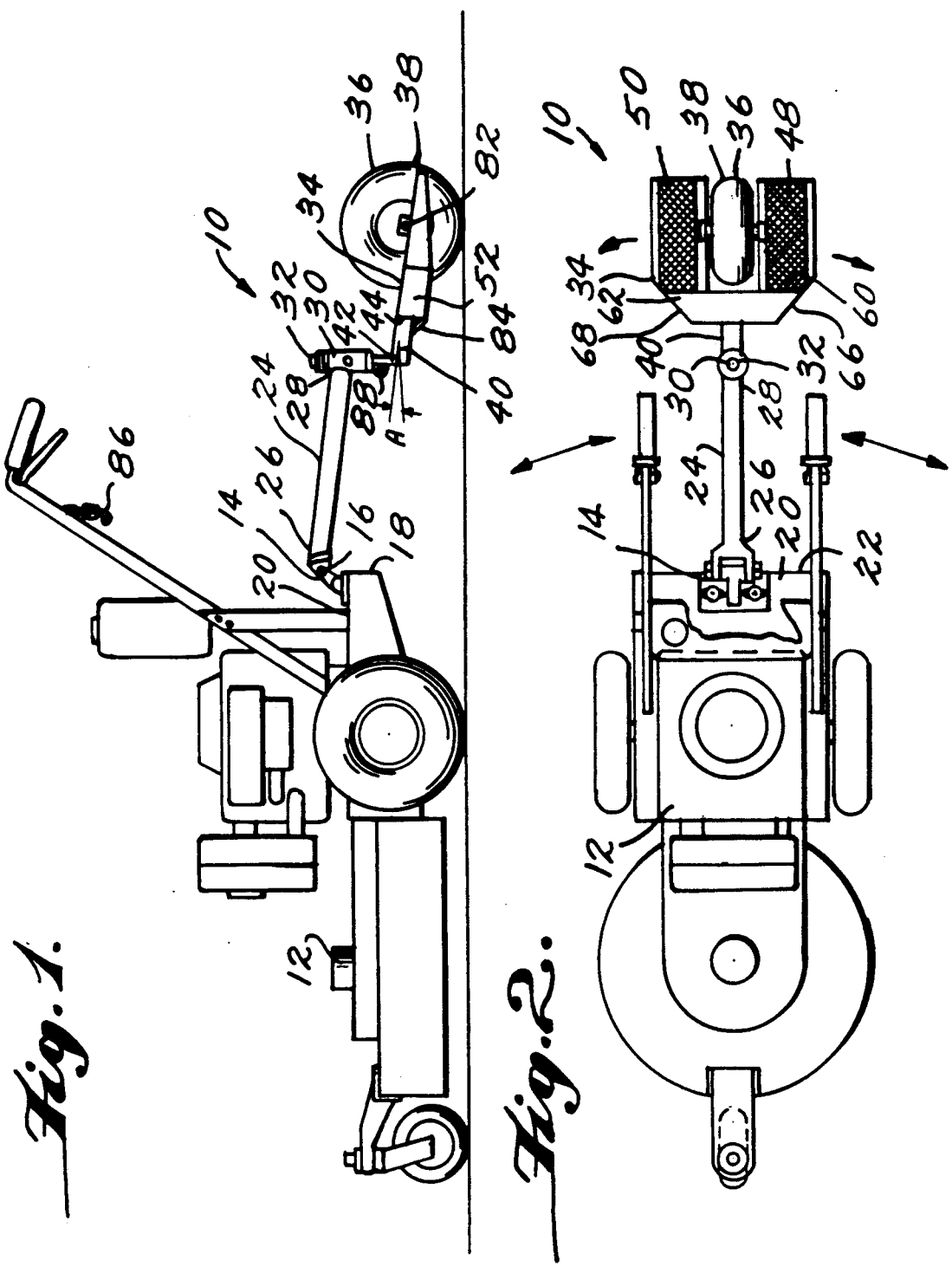

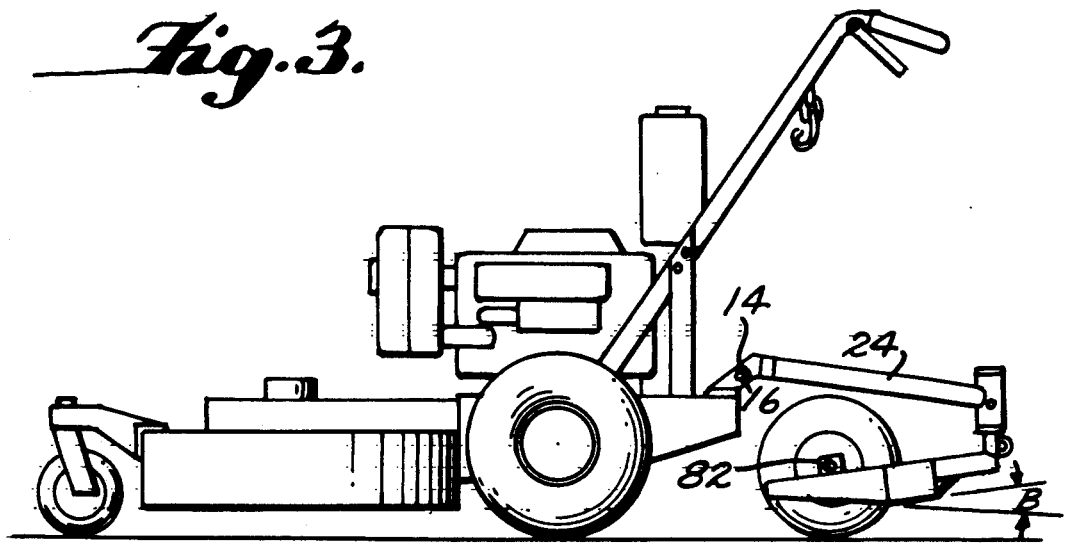
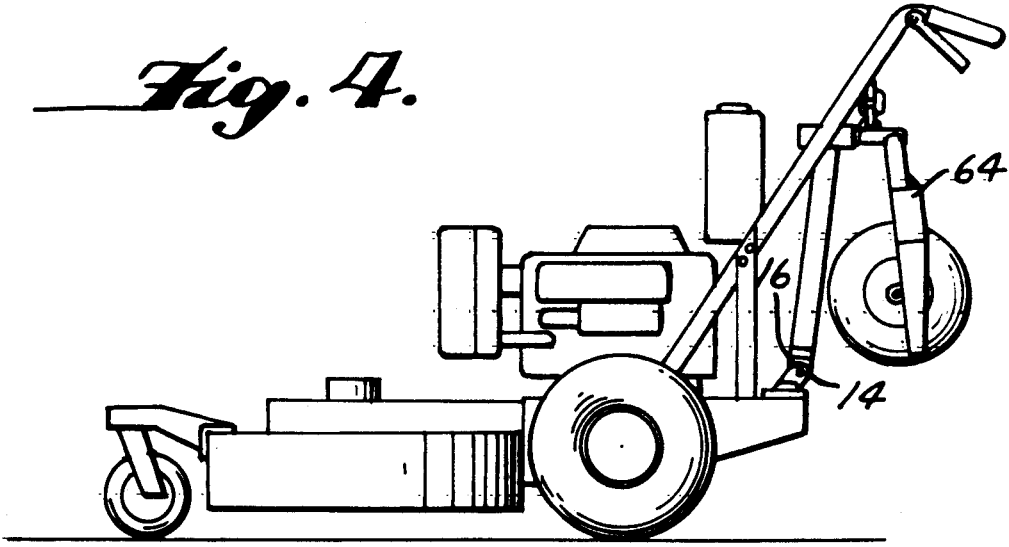
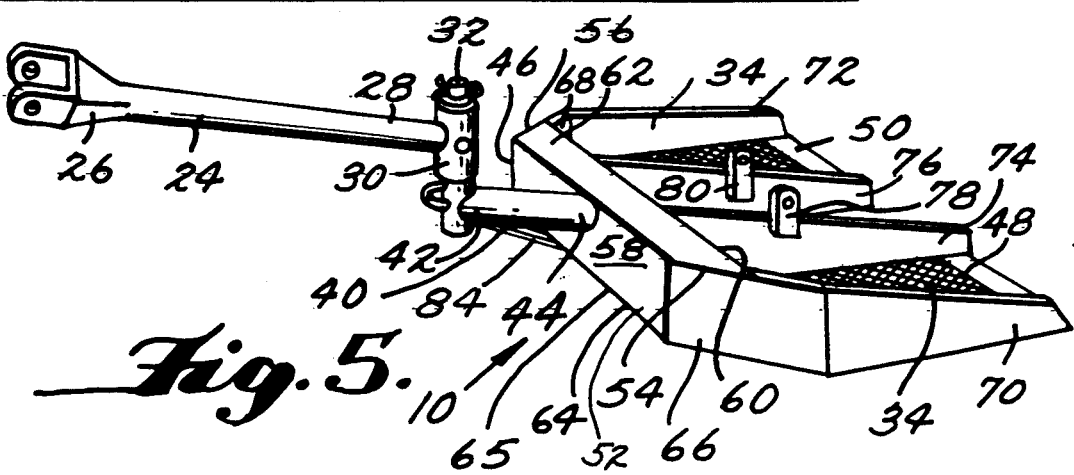

SULKY APPARATUS ATTACHABLE TO A SELF-PROPELLED POWER MOWER

This invention relates to sulky apparatus and more particularly to sulky apparatus which is attachable to a self-propelled power mower or the like for transporting an operator in a standing position.

It has become increasingly common practice for commercial lawn maintenance personnel to use large, powerful, self-propelled, walk-behind mowers. The mowers are typically propelled, braked and steered through two rear wheels by operating separate hand controlled squeeze levers on each side of the handlebars. Each of the rear wheels is individually braked and clutched to cause a steering affect.

BACKGROUND OF THE INVENTION

More and more powerful engines are being, installed on walk-behind mowers, and mowing speeds have been increased to jogging speed. The advantages of these walk-behind mowers to the commercial market are that they are simple to operate, inexpensive to purchase and maintain when compared to riding mowers, very maneuverable, will mow very steep hills, and two or three of them can fit on an ordinary pickup truck. The disadvantage of these mowers is that the operators must walk very quickly for up to eight to twelve hours per day, sometimes walking as many as forty to fifty miles in a day. This increases the cost of willing labor, increases employee turnover rate and results in increased mowing prices.

Various types of riding attachments have been designed to reduce the amount of walking required by mower operators, but they have not proved entirely satisfactory under all conditions of service because they restrict the maneuverability of the mower, take up excessive room during storage or transportation and do not permit easy reverse movement or operation of the mower. As a result, mower operators must frequently remove and reattach known sulkies and caddies for different conditions, and this is a time-consuming job which reduces the efficiency of the operator.

It is, therefore, an object of the present invention to provide sulky apparatus which is attachable to a self-propelled power mower or the like for transporting an operator in a standing position.

Another object is to provide such apparatus which is very maneuverable and which does not restrict the normal maneuverability of the mower.

A further object of the invention is the provision of such sulky apparatus which permits the mower operator to pull or to operate the mower in a reverse direction without removing or folding up the sulky apparatus.

Still another object is to provide such apparatus which folds up compactly under the handlebars of the mower when not in use and which permits normal use of the mower when in such a folded up position.

Yet another object of the present invention is the provision of such sulky apparatus which avoids the necessity for extreme twisting of the operator's body while steering the mower on sharp turns.

Another object is to provide such apparatus which is configured to permit the operator to maintain both hands on the handlebars of the mower during extremely sharp turns of the mower.

Still another object is to provide such sulky apparatus which is light in weight and which provides for maximum strength during use.

Another object is to provide such sulky apparatus which is easy and inexpensive to manufacture.

A still further object is to provide such sulky apparatus which is proportioned in its dimensions for enabling the operator to stay close to the mower handlebars during all maneuvers of the mower and the apparatus.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides sulky apparatus which is attachable to a self-propelled power mower or the like for transporting an operator in a standing position. The apparatus comprises hinge means defining a first pivot axis for attachment to the mower with the first axis in a normally substantially horizontal position; a first rigid arm, defining first and second ends, the first end connected to the hinge means for substantially vertical movement about the first axis; pivot means attached to the second end of the arm, the pivot means defining a second normally substantially vertical pivot axis; operator supporting means attached to and in operative relationship with the pivot means for freely rotating substantially horizontally completely about the second axis; and a wheel rotatably mounted on the operator supporting means.

In accordance with the invention, the pivot means enables unlimited movement of the supporting means and the wheel completely and freely about the pivot axis. A first horizontal distance between the first axis and the second axis is greater than a second horizontal distance between the second axis and the normally rearwardmost portion of the apparatus, and the wheel is of a predetermined size for enabling unlimited movement of the supporting means and the wheel about the second pivot axis. The size of the wheel normally permits free movement of the wheel beneath the arm as the supporting means and the wheel rotate about the second axis and past the arm.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate an example of a preferred embodiment of the invention and, together with the description, serve to explain the principles of the invention.

FIG. 1 is a side elevation view of the sulky apparatus attached to a conventional self-propelled power mower;

FIG. 2 is a top plan view, partly in fragment, showing the sulky apparatus attached to a conventional self-propelled power mower;

FIG. 3 is a side elevation view of the sulky apparatus attached to the mower and shown in position when the mower is being pulled backward or operated in a reverse direction and showing the apparatus in position prior to being moved to a folded-up position;

FIG. 4 is a side elevation view of the sulky apparatus attached to the mower and showing the apparatus in the folded-up or storage position; and FIG. 5 is a perspective view of the sulky apparatus but showing only a portion of the hinge for attaching the sulky apparatus to the mower.

DESCRIPTION OF THE PREFERRED EMBODIMENTS

With reference now to the drawings, wherein like reference characters designate like or corresponding parts throughout the several views, there is shown sulky apparatus 10 which is attachable to a self-propelled power mower 12 or the like for transporting an operator in a standing position.

Hinge means 14, defining a first pivot axis 16, is attached to mower 12 with axis 16 in a normally substantially horizontal position. Hinge 14 can be mounted on a back surface 18 of the mower or on a top surface 20 of the mower and adjacent to a rear edge 22 of the mower frame. The latter configuration is illustrated in the drawings.

A first rigid arm 24, defining a first end 26 and a second end 28, is positioned with first end 26 connected to hinge 14 for substantially vertical and pivotal movement about axis 16. Pivot means 30 are attached to end 28 of arm 24, and pivot means 30 define a second normally substantially vertical pivot axis 32. Pivot 30 typically is divided into an upper half and a lower half to allow free and uninhibited rotation of the pivot completely about axis 32. Operator supporting means 34 are attached to and in operative relationship with pivot means 30 for freely rotating substantially horizontally about axis 32, and a wheel 36 is rotatably mounted on operator supporting means 34.

Because pivot 30 is divided into an upper half and a lower half, unlimited movement of operator supporting means 34 and wheel 36 is permitted about pivot axis 32. To further permit unlimited movement of supporting means 34 and wheel 36 about pivot axis 32, a first horizontal distance between axis 16 and axis 32 is greater than a second horizontal distance between second axis 32 and the normally rearwardmost portion 38 of apparatus 10. Further, wheel 36 is of a predetermined size to permit the wheel to pass beneath arm 24. Wheel 36 and supporting means 34 are of predetermined sizes normally to permit free movement of wheel 36 and supporting means 34 beneath arm 24 as supporting means 34 and wheel 36 rotate about axis 32 and past arm 24.

In accordance with the invention, operator supporting means 34 include a second rigid arm 40 which defines a first end 40 and a second end 44. First end 42 is attached to pivot 30 for movement about pivot axis 32. A yoke member 46 is attached to arm 40, and foot-supporting plates 48, 50 are attached to yoke member 46. Wheel 36 is positioned in operative relationship with plates 48, 50 for supporting the plates. Arm 40 defines a longitudinal axis 41, and arm 40 is attached to pivot 30 with longitudinal axis 41 forming a first acute angle A with horizontal (see FIG. 1).

Yoke member 46 includes a hollow tubular element 52 which defines a substantially rectangular cross section and which includes first and second ends 54, 56. Tubular element 52 further includes a forward substantially rectangular element 58, an opposed rearward substantially rectangular element 60 having a longer lengthwise dimension than forward element 58, and opposed upper and lower substantially trapezoidally-shaped elements 62, 64 which extend between elements 58, 60.

The rectangular cross section of tubular element 52 is tilted at a slight angle with respect to horizontal, and lower element 64 defines a second acute angle B with horizontal (see FIG. 3). As a result, grass clippings or other debris from the mower readily pass underneath and beyond apparatus 10 rather than collecting in front of yoke member 46, and a plowing effect is avoided. The tilting of yoke member 46 with respect to horizontal also enables arm 40 to mate at substantially a right angle with forward element 58 of the yoke for ease of production. Angles A and B are preferably substantially equal to each other.

A first substantially flat outer element 66 covers first end 54 of tubular element 52 and is attached to first foot-supporting plate 48. A second substantially flat outer element 68 covers second end 56 of tubular element 52 and is attached to second foot-supporting plate 50. First outer element 66 is attached to and forms an angle of substantially forty-five degrees with rearward element 60, and second outer element 68 is attached to and forms an angle of substantially forty-five degrees with rearward element 60 whereby contact with uneven ground is minimized during operation of apparatus 10. The forty-five degree ends of yoke member 46 formed by elements 66, 68 also aid in the deflection of debris, reduce weight of the apparatus, improve the ease of production of the apparatus and streamline the appearance of the apparatus.

Apparatus 10 further includes a first side element 70 attached to foot-supporting plate 48 and to outer element 66 for restricting movement of the operator's foot off of plate 48. Similarly, a second side element 72 is attached to foot-supporting plate 50 and to outer element 68 for restricting movement of the operator's foot off of plate 50.

A third side element 74 is attached to rearward element 60, and side element 74 is attached to and projects above foot-supporting plate 48 for restricting movement of the operator's foot off of plate 48. Likewise, fourth side element 76 is attached to rearward element 60, and side element 76 is attached to and projects above foot-supporting plate 50 for restricting movement of the operator's foot off of plate 50.

Each of foot-supporting plates 48, 50 is preferably wider at the front than at the rear to save weight, to allow for the greater width needed in the toe area, and to minimize contact with uneven ground at the outside rear corners. Side elements 70, 72, 74 and 76 are preferably substantially triangular in shape and these elements connect and support foot-supporting plates 48, 50 to yoke 46. Elements 70, 72, 74 and 76 work as levers on yoke 46 during operation and use of apparatus 10, but the torsional rigidity provided by the configuration of yoke 46 prevents independent movement of elements 70–76.

A first axle mounting element 78 is attached to side element 74, and a second axle mounting element 80 is attached to side element 76. An axle 82 is rotatably mounted on axle mounting elements 78, 80, and wheel 36 is conventionally mounted on axle 82.

Axle mounting elements 78, 80 project above side elements 74, 76, and axle 82 is preferably mounted above side elements 74, 76 so that foot-supporting plates 48, 50 are positioned beneath the axle to provide a stable platform for the operator.

Arms 24, 40 are each preferably hollow, tubular members that are substantially circular in cross section for providing maximum torsional strength and for minimizing weight. High torsional strength in arms 24, 40 is required because the operator's weight can be fully loaded on one or the other of foot-supporting plates 48, 50 which will cause twisting forces to be applied to arms 24, 40. The hollow circular configuration of arms 24, 40 provides for high torsional strength which resists such forces.

A brace 84 is preferably connected between arm 40 and a lower edge 65 of element 64 for strengthening apparatus 10 and for deflecting curbs or other impediments as yoke 46 traverses the curb or impediment. This will avoid damage to yoke 46.

An important feature of apparatus 10 is the ratio of the horizontal distance between first axis 16 and second axis 32 and the horizontal distance between second axis 32 and the normally rearwardmost portion 38 of the apparatus. It has been determined that the optimum ratio of the horizontal distances is 1.07 with the horizontal distance between axes 16 and 32 being greater than the horizontal distance between axis 32 and rearwardmost portion 38 of the apparatus. Providing this optimum ratio of distances allows foot-supporting plates 48, 50 to move within a comfortable window of movement for the operator while steering mower 12 and apparatus 10. For example, increasing the horizontal distance between axes 16 and 32 in relation to the overall length of apparatus 10 will result in more extreme twisting of the operator's body while steering mower 12 through sharp turns. Conversely, shortening the horizontal distance between axes 16 and 32 relative to the overall length of apparatus 10 would cause the operator to become located too far from the handlebars/operator controls of the mower during sharp turns. It has been determined that the optimum ratio between the horizontal distances described is 1.07 to provide the most comfortable and effective window of movement for the operator while steering the equipment.

The feature of apparatus 10 wherein the horizontal distance between axes 16 and 32 is greater than the horizontal distance between axis 32 and rearwardmost portion 38 of apparatus 10 also is important to permit arm 40, yoke 46 and wheel 36 to castor freely a full 360 degrees and more about pivot axis 32 without impacting mower 12 when moving the mower in a reverse direction. Shortening the distance between axis 32 and rearwardmost portion 38 of apparatus 10 so that it is equal to or less than the horizontal distance between axes 16 and 32 will cause wheel 36 to impact the rearward portion of mower 12 when the mower is moved in a reverse direction.

Another important feature of this invention is that vertical pivot axis 32 is set back from the rear of mower 12 and is not positioned at or immediately adjacent to the rear of the mower. This results in the creation of a much smaller arc about vertical pivot axis 32 as mower 12 is turned and as apparatus 10 follows the mower in the turns. This enables the operator to keep his hands on both mower handlebars/operating controls during sharp turns of the mower. This advantage is not provided by sulkies which are attached to mowers by means of a vertical pivot axis that is positioned on the mower itself or immediately adjacent to the rear of the mower. In that type of embodiment, the arc described by the sulky during turns of the mower is much larger and it is difficult for the operator to keep his hands on the mower handlebars/operating controls during sharp turns of the mower.

The relative distances between axes 16 and 32 and between axis 32 and rearwardmost portion 38 of apparatus 10 also allows apparatus 10 to fold up under the handlebars of mower 12, as shown in FIG. 4. The length of arm 24 should also be determined in relation to the dimensions of mower 12. Lengthening arm 24 too much with respect to the dimensions of mower 12 will cause apparatus 10 to impact the handlebars of the mower and will interfere with the operating controls of the mower while apparatus 10 is in the folded/transport position. Likewise, shortening arm 24 too much will not permit apparatus 10 to be attached to hook 86 on mower 12.

In accordance with the invention, a fastening element 88 is attached to supporting means 34 for enabling apparatus 10 to be suspended from hook 86 and to be stored in a position on mower 12 to permit the operator to operate the mower while walking behind the mower in a normal manner.

Pivot 30 is preferably bushed with bronze bushings and is lubricated with grease through a conventional fitting. As small a pneumatic tire as possible is used for wheel 36 to reduce weight and bulk. The tire should be of sufficient width and diameter to prevent it from dropping into small recesses in the ground and to distribute the weight of the operator sufficiently to prevent sinking into soft surfaces, such as soft soil. Extra low air pressure is maintained in the tire to cushion the operator from jolts caused by rough ground.

The hollow rectangular cross section configuration of yoke 46 is important for reducing the weight of apparatus 10 and for providing high torsional strength. High torsional strength is important for yoke 46. For example, if the operator's entire weight is loaded on the rear of one of foot-supporting plates 48, 50 this would cause a flexing of yoke 46 if the yoke were not designed to resist such forces. Foot-supporting plates 48, 50 behave as "see-saws" with axle mounting elements 78, 80 acting as fulcrums. When the rear part of only one of foot-supporting plates 48 or 50 is loaded, it tends to lift its side of yoke 46. Because the middle of yoke 46 is attached to arm 40, the middle of yoke 46 resists such movement and acts as a fulcrum to yoke 46. Conversely, upward movement of the front of one of foot-supporting plates 48 or 50 tends to cause a downward movement of the other foot-supporting plate. Thus, there is a tendency for yoke 46 to twist, and it is important that the configuration of yoke 46 be such that such twisting movement is resisted.

In use, apparatus 10 is attached to mower 12 by hinge 14. The operator places his feet onto foot-supporting plates 48, 50 and grasps the handlebars/operating controls of conventional mower 12. The mower can be moved in a reverse direction and the operator simply steps off of foot-supporting plates 48, 50 as he moves mower 12 in a reverse direction. Wheel 36 and those portions of apparatus 10 normally trailing behind pivot 30 will then freely rotate about pivot axis 32 so that wheel 36 is positioned adjacent to or beneath arm 24, as shown in FIG. 3.

Apparatus 10 can be quickly and easily folded up under the handlebars of mower 12 by raising apparatus 10 so that it rotates upwardly about hinge 14. Hook 86 is then passed through fastening element 88, or in an alternative embodiment hook 86 can be caused to grasp brace 84. Apparatus 10 is then held in a position to permit mower 12 to be operated in a conventional manner with the operator walking behind the mower, or the mower can be conveniently transported with apparatus 10 in the folded up position. This position is illustrated in FIG. 4.

This invention provides a sulky apparatus which is attachable to a self-propelled power mower or the like and which is inexpensive to manufacture and maintain. Further, the sulky apparatus of this invention is extremely versatile and permits the operator to increase his efficiency.

The invention in its broader aspects is not limited to the specific details shown and described, and departures may be made from such details without departing from the principles of the invention and without sacrificing its chief advantages.

What is claimed is:

1. Sulky apparatus attachable to a self-propelled vehicle, such as a power mower, for transporting an operator, said apparatus comprising:

hinge means, defining a first pivot axis for attachment to said mower with said first axis in a normally substantially horizontal position;

a first rigid arm, defining first and second ends, said first end connected to said hinge means for substantially pivotal movement about said first axis;

pivot means attached to said second end of said arm, said pivot means defining a second normally substantially vertical pivot axis;

operator supporting means attached to and in operative relationship with said pivot means for freely rotating substantially horizontally about said second axis;

a wheel rotatably mounted on said operator supporting means;

said pivot means enabling unlimited movement of said supporting means and said wheel completely about said pivot axis; and said wheel and said supporting means of predetermined sizes normally to permit free movement of said wheel and said supporting means beneath said arm as said supporting means and said wheel rotate about said second axis and past said arm.

2. Apparatus as in claim 1 wherein a first horizontal distance between said first axis and said second axis is greater than a second horizontal distance between said second axis and the normally rearwardmost portion of said apparatus.

3. Apparatus as in claim 2 wherein said operator supporting means include:

a second rigid arm, defining first and second ends, said first end attached to said pivot means for movement about said pivot axis;

a yoke member attached to said second arm;

first and second foot-supporting plates attached to said yoke member; and said wheel in operative relationship with said plates for supporting said plates.

4. Apparatus as in claim 3 wherein said second arm defines a longitudinal axis and wherein said second arm is attached to said pivot means with said longitudinal axis forming a first acute angle with horizontal.

5. Apparatus as in claim 4 wherein said yoke member includes a tubular element having first and second ends and defining a substantially rectangular cross section.

6. Apparatus as in claim 5 wherein said tubular element includes a forward substantially rectangular element, an opposed rearward substantially rectangular element having a longer lengthwise dimension than said forward element and opposed upper and lower substantially trapezoidally-shaped elements extending between said forward and said rearward elements.

7. Apparatus as in claim 6 wherein said lower element defines a second acute angle with horizontal, whereby grass clippings or other debris from the mower readily pass underneath and beyond said yoke and said plates.

8. Apparatus as in claim 7 wherein said first and second acute angles are substantially the same.

9. Apparatus as in claim 8 further including:

a first substantially flat outer element covering said first end of said tubular element and attached to said first foot-supporting plate; and a second substantially flat outer element covering said second end of said tubular element and attached to said second foot-supporting plate.

10. Apparatus as in claim 9 wherein said first outer element is attached to and forms an angle of substantially forty-five degrees with said rearward rectangular element and wherein said second outer element is attached to and forms an angle of substantially forty-five degrees with said rearward rectangular element, whereby contact with uneven ground by said yoke member is minimized during operation of said apparatus.

11. Apparatus as in claim 10 further including:

a first side element attached to said first foot-supporting plate and to said first outer element for restricting movement of said operator's foot off said first plate; and a second side element attached to said second foot-supporting plate and to said second outer element for restricting movement of said operator's foot off said second plate.

12. Apparatus as in claim 11 further including:

a third side element attached to said rearward rectangular element and attached to and projecting above said first foot-supporting plate for restricting movement of said operator's foot off said first plate; and a fourth side element attached to said rearward rectangular element and attached to and projecting above said second foot-supporting plate for restricting movement of said operator's foot off said second plate.

13. Apparatus as in claim 12 further including:

a first axle mounting element attached to said third side element;

a second axle mounting element attached to said fourth side element;

an axle rotatably mounted on said axle mounting elements; and said wheel mounted on said axle.

14. Apparatus as in claim 13 wherein said axle mounting elements project, respectively, above said third and said fourth side elements, said axle mounted above said third and said fourth side elements, whereby said foot-supporting plates are positioned beneath said axle to provide a stable platform for the operator.

15. Apparatus as in claim 14 wherein said first arm and said second arm are each hollow tubular members substantially circular in cross section for providing maximum torsional strength.

16. Apparatus as in claim 15 wherein each of said foot-supporting plates defines a forward end and a rearward end and wherein each of said forward ends is wider than each of said rearward ends, whereby contact with the ground by said rearward ends is minimized during operation of said apparatus.

17. Apparatus as in claim 1 further including a hook attached to said mower and means attached to said operator supporting means for enabling said apparatus to be suspended from said hook and to be stored in a position on said mower to permit the operator to operate the mower while walking behind the mower in a normal manner.

18. Apparatus as in claim 2 wherein the ratio of said first horizontal distance to said second horizontal distance is 1.07 for providing optimum operating characteristics for the comfort and safety of the operator.

* * * * *